United States Patent
Blicker

(10) Patent No.: US 8,533,034 B2
(45) Date of Patent: Sep. 10, 2013

(54) METHOD FOR REAL-TIME CREDIT CALCULATION OF DIFFERENT LOYALTY PROGRAMS BASED ON CALL BEHAVIOR AND USE OF IP-BASED MULTIMEDIA SUBSYSTEM (IMS) SERVICES

(75) Inventor: Stefan Blicker, Wachtberg (DE)

(73) Assignee: T-Mobile International AG, Bonn (DE)

( * ) Notice: Subject to any disclaimer, the term of this patent is extended or adjusted under 35 U.S.C. 154(b) by 507 days.

(21) Appl. No.: 12/664,522

(22) PCT Filed: Jun. 6, 2008

(86) PCT No.: PCT/EP2008/004509
§ 371 (c)(1),
(2), (4) Date: Jun. 11, 2010

(87) PCT Pub. No.: WO2008/151757
PCT Pub. Date: Dec. 18, 2008

(65) Prior Publication Data
US 2010/0268590 A1 Oct. 21, 2010

(30) Foreign Application Priority Data

Jun. 13, 2007 (DE) .................. 10 2007 027 190

(51) Int. Cl.
*G06Q 30/00* (2012.01)
(52) U.S. Cl.
USPC .................. 705/14.27; 705/14.28; 705/14.32
(58) Field of Classification Search
USPC ................... 705/14.27, 14.28, 14.32
See application file for complete search history.

(56) References Cited

U.S. PATENT DOCUMENTS

| 6,043,531 | A | 3/2000 | Stecher et al. | |
| 7,747,461 | B2* | 6/2010 | Sheth et al. | 705/14.32 |
| 8,024,211 | B1* | 9/2011 | Cohen | 705/7.14 |
| 8,024,220 | B2* | 9/2011 | Ariff et al. | 705/14.28 |
| 8,031,702 | B2* | 10/2011 | Koskinen et al. | 370/356 |
| 8,156,206 | B2* | 4/2012 | Kiley et al. | 709/220 |

(Continued)

FOREIGN PATENT DOCUMENTS

| DE | 19709002 A1 | 9/1998 |
| EP | 1001327 A2 | 5/2000 |
| EP | 1045324 A | 10/2000 |
| WO | 2007/014751 A1 | 2/2007 |

OTHER PUBLICATIONS

Japanese Examination Report of JP Appln. No. 2010-511529 dated Mar. 5, 2013.

*Primary Examiner* — John G Weiss
*Assistant Examiner* — Sam Refai
(74) *Attorney, Agent, or Firm* — Browdy and Neimark, PLLC

(57) ABSTRACT

The invention relates to a method for real time credit calculation of differing loyalty programs based on telephone usage of a user and use of IP-based multimedia sub system (IMS) services, wherein statistical data for the user is recorded and stored in a databank by means of an OSAS (Online Statistic Advertisement Server) service. The invention is characterized by storage of loyalty profiles in the LPF, registration of the customer in the IMS, start up of a service by the customer/user, contacting the OSAS in real time via the HSS profile, recording the statistics in real time for the service such as, for example, type, time spans and similar, triggering the OLS based on the HSS profile, startup of the interfaces by the OLS, use of operator systems through the OLS and provision of the service after contacting the OLS.

12 Claims, 2 Drawing Sheets

(56) References Cited

U.S. PATENT DOCUMENTS

| | | | |
|---|---|---|---|
| 8,180,671 B2* | 5/2012 | Cohagan et al. | 705/14.3 |
| 2004/0097245 A1* | 5/2004 | Sheth et al. | 455/466 |
| 2004/0249710 A1* | 12/2004 | Smith et al. | 705/14 |
| 2005/0010472 A1* | 1/2005 | Quatse et al. | 705/14 |
| 2005/0091367 A1 | 4/2005 | Pyhalammi et al. | |
| 2006/0277100 A1* | 12/2006 | Parham | 705/14 |
| 2008/0177994 A1* | 7/2008 | Mayer | 713/2 |
| 2008/0228582 A1* | 9/2008 | Fordyce et al. | 705/14 |
| 2009/0177540 A1* | 7/2009 | Quatse | 705/14 |
| 2009/0182630 A1* | 7/2009 | Otto et al. | 705/14 |
| 2009/0287563 A1* | 11/2009 | Mone et al. | 705/14.33 |
| 2010/0312586 A1* | 12/2010 | Drefs | 705/5 |

* cited by examiner

METHOD FOR REAL-TIME CREDIT CALCULATION OF DIFFERENT LOYALTY PROGRAMS BASED ON CALL BEHAVIOR AND USE OF IP-BASED MULTIMEDIA SUBSYSTEM (IMS) SERVICES

FIELD

The invention relates to a method for real-time credit calculation of different loyalty programs according to the call behavior and use of services in the IP-based multimedia subsystem (IMS) services, wherein statistical data for the user is recorded and stored in a database by means of an OSAS (Online Statistics Advertisement Server) service.

BACKGROUND

Loyalty programs nowadays are an important instrument for gaining and retaining new and existing customers and are, therefore, increasingly gaining in importance.

Combining different loyalty programs in a targeted manner opens up access to loyalty systems for a company that improve customer retention and attraction of new customers.

One most important, already available program for retaining top and steady customers is the bonus or rebate marketing, for example. Such a bonus or rebate marketing offers the consumer the advantage that an overall outstanding value of the provided services is offered by the provider, thereby resulting in a competitive advantage for the provider.

One important business sector in which to apply such a method is the current telecommunications sector. Because of the continuing downward trend of prices for the services that are being made available in this sector and increasingly more advantageous contract conditions for the customer, a relatively high fluctuation of existing customers between telecommunications providers can be seen for such services.

A reduction in customer fluctuation and/or retention and expansion of existing customers can be achieved, for example, through the use of a loyalty program that provides for crediting the customer or user with earned bonuses.

Administering such loyalty programs is therefore applicable and advantageous also in the field of IP-based systems.

In future IP-based systems, such as IMS (IP Multimedia Subsystem), criteria for crediting loyalty bonuses can be defined and also incorporated relatively easily.

Such criteria for crediting loyalty bonuses are, for example, call data, such as the duration, time intervals, the date, month and/or year.

It is known that a method and system for collecting user behavior during run-time are performed in the mobile 3GPP IP-based multimedia subsystem by means of an online server. This online server (OSAS: Online Statistics and Advertisement Server) is an application server component that is integrated into the IMS session and into the corresponding signaling traffic. This OSAS has the significant advantage that the user behavior can be viewed online during the run-time and not only in offline mode, like with the CDR analysis (Call Detailed Record) that is known from the prior art, which has a delay of, at times, several hours.

With an OSAS it is possible, for example, to collect relevant statistical data in a communication system and perform an analysis of the user behavior during the run-time of the application.

An OSAS can therefore also be used for analyzing the call behavior of a user, with the OSAS performing the collection, analysis and presentation of all customer data online and nearly in real time to provide complete web statistics for customers who utilized web-based services, as well as a detailed break-down of the origin of the users, both according to geographical factors and broken down by firms and organizations. Consequently, these recorded statistical data can also be used for a bonus program for crediting a bonus to the user based on the user's call behavior.

This method has the significant shortcoming, however, that an analysis of the determined run-time data and comparison with stored profile data from different loyalty programs can be implemented only by means of an auxiliary function.

SUMMARY

The invention has therefore made it its object to provide a method and a system that credits to the user of IP systems bonuses from different bonus programs (loyalty programs), thereby ensuring an improved customer retention/attraction of new customers for the provider of IP services.

This object is achieved by a method for real-time credit calculation of different loyalty programs based on the call behavior of a user and use of IP-based multimedia subsystem (IMS) services, wherein statistical data for the user is recorded and stored in a database by means of an OSAS (Online Statistics Advertisement Server) service. The method includes storing of loyalty profiles in the LPF (4). This data contains all elements required to verify the above-described criteria for crediting loyalty bonuses and to control said criteria, and is defined by the marketing operator or by sales partners. The method further includes registration of the customer at the IMS (10) (IP multimedia subsystem), recognition of the customer via the HSS profile (8) in the IMS (10) (IP multimedia subsystem) who is participating in the loyalty program, initiation of a service by the customer/user, contacting of the OSAS (3) at run-time via the HSS profile (8) and recording the run-time statistics for the service, such as, for example, type, time, time intervals and the like, triggering of the OLS (5) (Online Loyalty Server) based on the HSS profile (8) in such a way, for example, that it accesses the LPF (4) and OSAS (3) via a SOA backplane (2) (Service Oriented Architecture), in order to match the statistics to the profile data, activating of the interfaces by the OLS (5) if the relevant preconditions for a loyalty program are met, for example in order to credit a balance in the Operator Systems (1), utilization of Operator Systems by the OLS (5), in order to inform the customer about run-times of loyalty transactions, for example by MMS (Multiple Media Service) or SMS (Short Message Service) that inform the customer about the current balance, coupons, current bonus miles, etc., and providing the service after contacting the OLS (5).

A major feature is that statistical data of a user is recorded and stored by means of an OSAS service in a corresponding database, wherein this data can be used for crediting a bonus for different loyalty programs according to the user behavior (call behavior) and use of IMS services.

In addition to the criteria for crediting a loyalty bonus by recording user data, such as the duration, time intervals, the date, month and/or year, other criteria can be applied as well for crediting a loyalty bonus, such as, for example:

telephone numbers (location-based, service telephone numbers);
random generator functions that trigger a certain type of use of mobile radio communication services, which is subsequently credited to the customer as bonuses;
destination-based, own PLMN (Public Land Mobile Network), own or preferred fixed network, or third-party PLMNs;

bundle-based criteria, for example use of different services, such as SMS, video telephony, MMS, etc.; and/or requirements that are defined by sales partners directly, such as, for example, a profile definition by an airline company that administers a bonus system for miles traveled by airline passengers.

The customers or users who wish to participate in these loyalty programs are accordingly subscribed as such in a so-called HSS (Home Subscriber Server). The loyalty programs are thus a part of the customer's subscription in the IMS.

An accurate and detailed definition of such criteria for a loyalty program depends, for example, on marketing-related requirements and on the requirements of the sales partners who wish to credit their customers with a loyalty bonus.

An example of such a bonus program is the commonly known "Miles and More" bonus program, which provides for crediting airline passengers according to booked or flown flight distances with the flown miles for these flight distances in the form of points on a customer account, and a certain number of points then enables the airline passenger to use, for example, supplementary services for future flights.

Possible bonuses for the use of features and services by a customer in the IP-based multimedia subsystem (IMS) may be, for example:
- an operator's own bonuses, such as the crediting of telephone minutes or credits for any relevant mobile radio services (SMS, MMS, video telephony, web presence, instant messages, etc.); and/or
- sales-partner-related bonuses like, for example, in the "Miles and More" program, cash reward coupons, merchandise coupons, coupons for events, sweepstakes, etc.

The underlying technology is aimed at supporting these market-based programs in the IMS (IP-based multimedia subsystem) in the simplest manner possible and implementing them relatively quickly.

BRIEF DESCRIPTION OF THE DRAWINGS

The invention will be explained in greater detail below in conjunction with a drawing depicting one possible method of implementation. Additional features that are essential to the invention and benefits of the invention will become apparent from the drawing and from its description, where.

DETAILED DESCRIPTION

Figure 1:
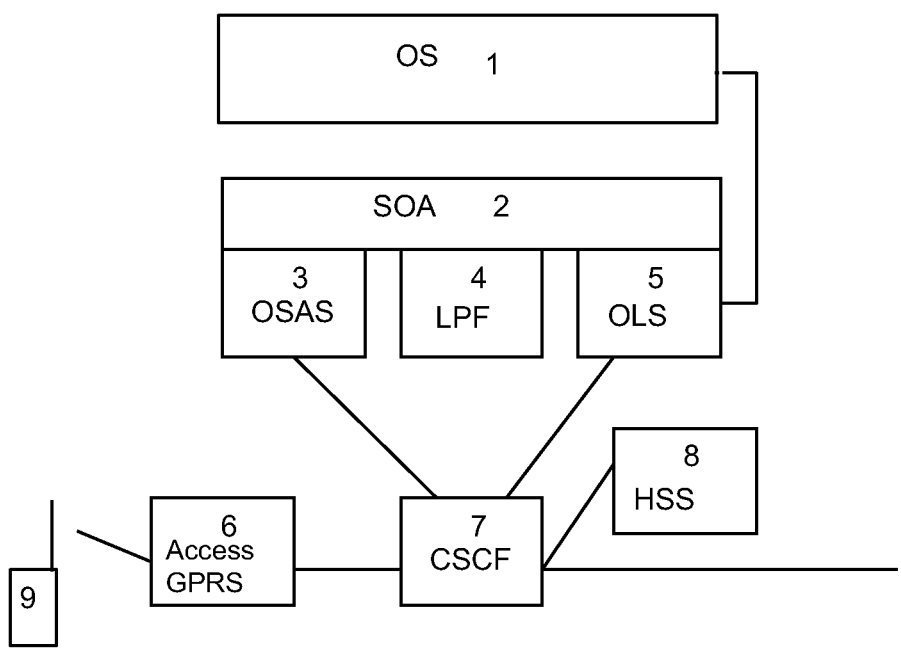
FIG. 1 shows an inventive architecture of the loyalty functionality.
Figure 2:
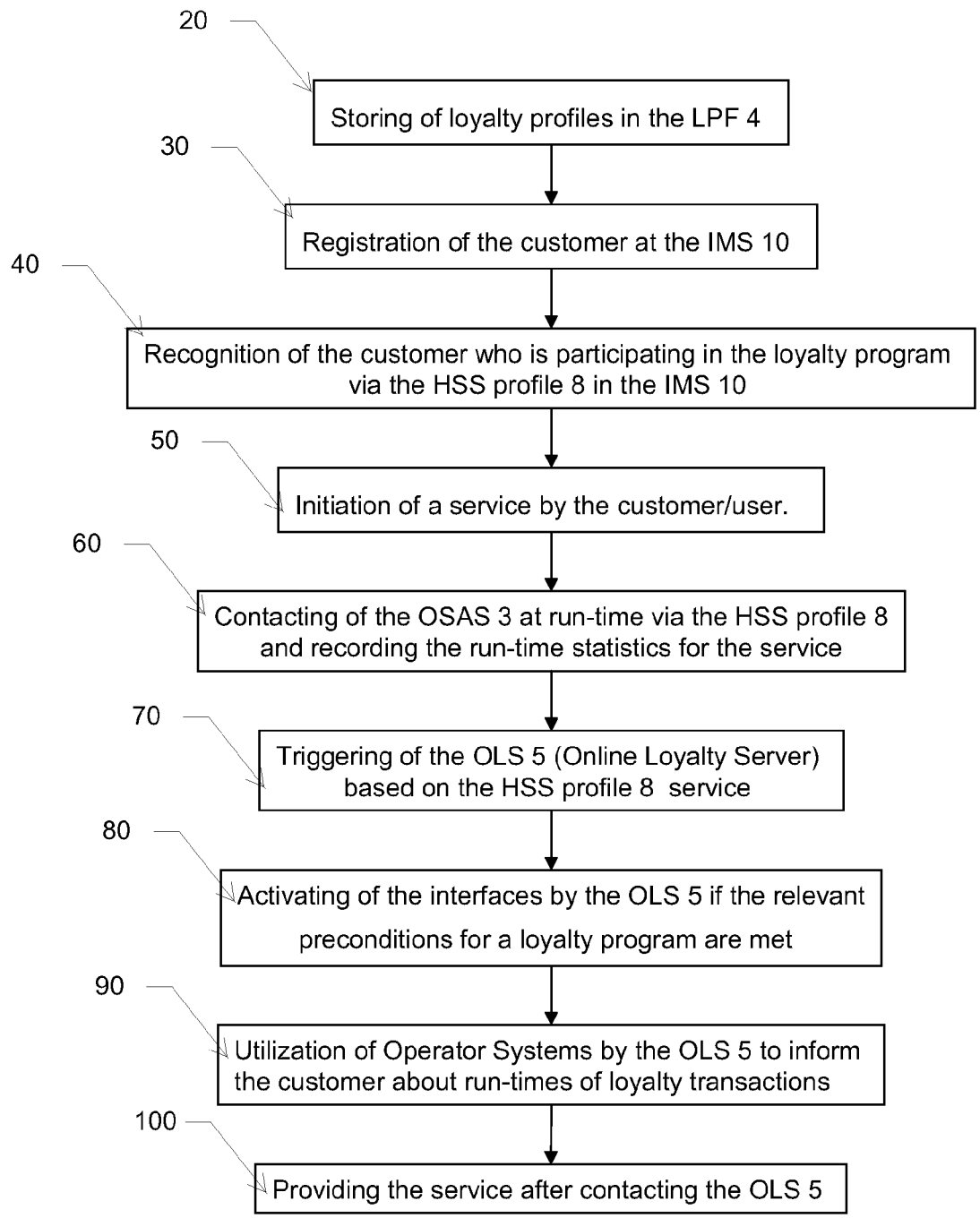
FIG. 2 shows an inventive method of the loyalty functionality.

The functional flow and method steps depicted in FIG. 1 and FIG. 2 for carrying out an inventive loyalty function shows that, for run-time-based inclusion, the OSAS 3 (Online Statistics and Advertisement Server) system serves as the basis for run-time-based inclusion of criteria for different types of loyalty programs.

This involves that the OSAS 3 records in the IMS 10 the data for the run-time determination that is used for the subsequent loyalty programs.

This requires that the data of the OSAS System 3 is analyzed at run-time.

Such an analysis of the recorded data requires an additional function that compares the recorded data of the OSAS System 3 to a stored LPF function profile 4 (Loyalty Profile Function).

This LPF function 4 is a database function that stores the profiles of loyalty programs.

An additional function for executing the loyalty programs is provided by the OLS 5 (Online Loyalty Server) service logic.

The OLS 5 is contacted at the recorded run-time and provides the necessary interfaces to the operator systems 1 in order to credit the appropriate bonus at the corresponding recorded run-time.

This involves that, while the service is being rendered, the OLS 5 is triggered only if the respective customer is subscribed in the HSS 8 (Home Subscriber Server) as a customer participating in loyalty programs.

The required architecture for the sequence of rendering a service with a loyalty function in the IMS 10 is illustrated in FIG. 1 and has the following method steps:

Storing of loyalty profiles in the LPF 4 (step 20).
   This data contains all elements required to verify the above-described criteria for crediting loyalty bonuses and to
   control said criteria, and is defined by the marketing operator or by sales partners.
Registration of the customer at the IMS 10 (IP multimedia subsystem) (step 30).
Recognition of the customer who is participating in the loyalty program via the HSS profile 8 in the IMS 10 (IP multimedia subsystem) (step 40).
Initiation of a service by the customer/user (step 50).
Contacting of the OSAS 3 at run-time via the HSS profile 8 and recording the run-time statistics for the service, such as, for example, type, time, time intervals and the like (step 60).
Triggering of the OLS 5 (Online Loyalty Server) based on the HSS profile 8 in such a way, for example, that it accesses the LPF 4 and OSAS 3 via a SOA backplane 2 (Service Oriented Architecture), in order to match the statistics to the profile data (step 70).
Activating of the interfaces by the OLS 5 if the relevant preconditions for a loyalty program are met, for example in order to credit a balance in the Operator Systems 1 (step 80).
Utilization of Operator Systems by the OLS 5, in order to inform the customer about run-times of loyalty transactions, for example by MMS (Multiple Media Service) or SMS (Short Message Service) that inform the customer about the current balance, coupons, current bonus miles, etc. (step 90).
Providing the service after contacting the OLS 5 (step 100).

With these method steps it is ensured that the IMS subscription 10 is given a parameter that is reserved for loyalty programs. The OLS 5 is accordingly triggered only if the customer is unambiguously designated as an IMS customer who participates in loyalty programs.

Novel functions are made available—LPF 4 (Loyalty Profile Function) and OLS 5 (Online Loyalty Server) for controlling and defining loyalty programs in the IP-based multimedia subsystem.

The LPF 4 stores profiles that define loyalty programs, such as for example operator-based or sales-partner-based, wherein the profiles contain triggers.
The profiles of the LPF 4 include triggers and descriptions for the bonus programs, such as for example, monetary credits, mileage credits, or bonus awards of any kind.
The OLS 5 controls, at run-time, the application of loyalty credits to customer accounts via the operator billing systems.

Additionally, interfaces are made available for processing and for informing the customer.

The interfaces can lie within the operator domain and also link to third parties, such as, for example, to airline companies carrying out the "Miles and More" bonus program.

The OLS 5 performs the central function in this context, which carries out the service logic and triggers the credits.

The method for account settlement of loyalty programs is based on the comparison of run-time statistics to pre-defined loyalty profiles the matching of the statistics to the run-time profiles notification of the end customer about bonuses credited by different methods at run-time, e.g. by SMS, MMS, or offline through third parties, or portals, or by mail, applying the credits to customer accounts via defined interfaces, random generator function in the LPF 4, in order to credit the customer with a balance or bonuses according to randomly generated profiles, for example for sweepstakes or participation in quiz contests.

The subject matter of the present invention is derived not only from the subject matter of the individual claims, but also from the combination of the individual claims with one another.

All information and features disclosed herein, including in the abstract, and in particular the three-dimensional embodiment depicted in the drawings are claimed as essential to the invention to the extent that they are novel, either individually or in combination with each other, over the prior art.

What is claimed is:

1. A method for real-time credit calculation of different loyalty programs based on call behavior of a user and use of IP-based multimedia subsystem (IMS) services by the user, wherein statistical data about the call behavior and use of the IMS services for the user is recorded and stored in a database by an Online Statistics Advertisement Server (OSAS) service, the method comprising:

storing loyalty profiles in a Loyalty Function Profile (LFP), the LFP containing all elements required to verify that criteria for crediting loyalty bonuses are met by the user and to control said criteria, is the LFP being defined by a marketing operator or the loyalty programs or by sales partners;

registering the user at the IP multimedia subsystem (IMS);

recognizing the user as a customer who is participating in the loyalty program by locating a Home Subscriber Server (HSS) profile for that user stored in the HSS in the IMS, the loyalty programs to which the customer subscribes being stored as part of the customer's subscription in the IMS;

initiating a service by the customer;

contacting the OSAS at run-time via the HSS profile and recording the run-time statistics for the service, including type, time, and time intervals;

triggering an Online Loyalty Server (OLS) based on the HSS profile so that the OLS Server accesses the LFP and the OSAS via a Service Oriented Architecture (SOA) backplane, to match the statistics to the profile data;

activating interfaces by the OLS if the relevant preconditions for one of the loyalty programs are met to credit a balance in the Operator Systems for the user;

using Operator Systems via the OLS, to inform the customer about run-times of loyalty transactions, that inform the customer about information, including current balance, coupons, current bonus miles; and providing service after contacting the OLS.

2. A method according to claim 1, wherein the IMS subscription has a parameter that is reserved for loyalty programs, wherein the OLS is triggered when the customer is unambiguously designated as an IMS customer who participates in loyalty programs.

3. A method according to claim 1, wherein the LFP stores profiles that define loyalty programs, including operator-based or sales-partner-based programs, wherein the profiles contain triggers.

4. A method according to claim 1, wherein the profiles of the LFP have descriptions for the bonus programs, including monetary credits, mile credits, or bonus awards of some other kind.

5. A method according to claim 1, wherein the OLS controls, at run-time, the application of loyalty credits to customer accounts via operator billing systems, wherein interfaces are additionally made available for processing and for informing the customer.

6. A method according to claim 1, wherein the interfaces lie within the operator domain and also link to third parties, including to airline companies carrying out the "Miles and More" bonus program.

7. A method according to claim 1, wherein the OLS performs a central function that carries out a service logic and triggers credits.

8. A method according to claim 1, wherein the method for account settlement of loyalty programs is based on the comparison of run-time statistics to predefined loyalty profiles.

9. A method according to claim 1, wherein the method is based on the matching of the statistics to the run-time profiles.

10. A method according to claim 1, wherein the method is based on the notification of the end customer about bonuses credited by different methods at run-time, or offline through third parties, or portals, or by mail, wherein the applying of credits to customer accounts is carried out via defined interfaces.

11. A method according to claim 1, wherein the method carries out a random generator function in the LPF, to credit the customer with a balance or bonus according to randomly generated profiles, for sweepstakes or participation in quiz contests.

12. A method according to claim 1, wherein the step of using Operator Systems via the OLS, to inform the customer about run-times of loyalty transactions comprises using MMS (Multiple Messaging Service) or SMS (Short Message Service) to so inform the customer.

* * * * *